(12) United States Patent
Wang et al.

(10) Patent No.: US 11,165,937 B2
(45) Date of Patent: Nov. 2, 2021

(54) ELECTROMAGNETIC INTERFERENCE CONTROL METHOD AND RELATED DEVICE

(71) Applicant: GUANGDONG OPPO MOBILE TELECOMMUNICATIONS CORP., LTD., Dongguan (CN)

(72) Inventors: Xunfeng Wang, Dongguan (CN); Kai Tang, Dongguan (CN); Zhengpeng Tan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/337,419

(22) Filed: Jun. 3, 2021

(65) Prior Publication Data

US 2021/0297570 A1 Sep. 23, 2021

Related U.S. Application Data

(63) Continuation of application No. PCT/CN2019/103743, filed on Aug. 30, 2019.

(30) Foreign Application Priority Data

Dec. 4, 2018 (CN) .......................... 201811473998.1

(51) Int. Cl.
*H04N 5/225* (2006.01)
*H04N 5/232* (2006.01)
(Continued)

(52) U.S. Cl.
CPC ......... *H04N 5/22521* (2018.08); *H04B 15/02* (2013.01); *H04N 5/04* (2013.01); *H04N 5/23232* (2013.01); *H04W 4/20* (2013.01)

(58) Field of Classification Search
CPC .. H04N 5/22521; H04N 5/04; H04N 5/23232; H04B 15/02; H04W 4/20
See application file for complete search history.

(56) References Cited

U.S. PATENT DOCUMENTS

| 9,867,139 B1 | 1/2018 | Khasgiwala et al. | |
|---|---|---|---|
| 2010/0075712 A1* | 3/2010 | Sethuraman | H04M 1/6041 455/556.1 |

(Continued)

FOREIGN PATENT DOCUMENTS

| CN | 106374969 A | 2/2017 |
|---|---|---|
| CN | 107018604 A | 8/2017 |

(Continued)

OTHER PUBLICATIONS

International Search Report and the Written Opinion From the International Searching Authority issued in corresponding International Application No. PCT/CN2019/103743, dated Nov. 26, 2019, 12 pages.

(Continued)

*Primary Examiner* — Gevell V Selby
(74) *Attorney, Agent, or Firm* — Baye PLLC

(57) ABSTRACT

Disclosed are an electromagnetic interference control method, an electronic device and a non-transitory computer-readable storage medium. The method includes detecting whether a camera of the electronic device is activated, responsive to detecting that the electronic device receives a voice communication service; detecting whether electromagnetic interference occurs between the camera and a radio frequency system of the electronic device, responsive to detecting that the camera is activated; if yes, responsive to determining that the currently activated primary antenna is a first antenna, sending a first preset instruction to a modem by an application processor; and receiving the first preset instruction by the modem for switching the activated (Continued)

antenna from the first antenna to a second antenna and fix. Based on the method, the interference of a radio frequency system on a mobile phone camera is reduced, camera screen crash or jam is reduced, and imaging quality is improved.

15 Claims, 4 Drawing Sheets

(51) Int. Cl.
  *H04B 15/02* (2006.01)
  *H04W 4/20* (2018.01)
  *H04N 5/04* (2006.01)

(56) References Cited

U.S. PATENT DOCUMENTS

| | | | |
|---|---|---|---|
| 2011/0026443 A1* | 2/2011 | Okada | H01P 1/17 370/280 |
| 2015/0024696 A1 | 1/2015 | Jin | |
| 2017/0136959 A1* | 5/2017 | Denny | H04N 5/2253 |
| 2017/0149477 A1 | 5/2017 | Zhu | |

FOREIGN PATENT DOCUMENTS

| | | |
|---|---|---|
| CN | 107493414 A | 12/2017 |
| CN | 108063646 A | 5/2018 |
| CN | 108282192 A | 7/2018 |
| CN | 108600520 A | 9/2018 |
| CN | 108649990 A | 10/2018 |
| CN | 109450510 A | 3/2019 |
| CN | 109639368 A | 4/2019 |

OTHER PUBLICATIONS

The First Office Action issued in corresponding China Application No. 201811473998.1, dated Mar. 13, 2020, 22 pages.

The Second Office Action issued in corresponding Chinese Application No. 201811473998.1, dated Jun. 3, 2020, 19 pages.

Notification to Grant Patent Right for Invention issued in corresponding Chinese Application No. 201811473998.1. dated Aug. 24, 2020, 6 pages.

* cited by examiner

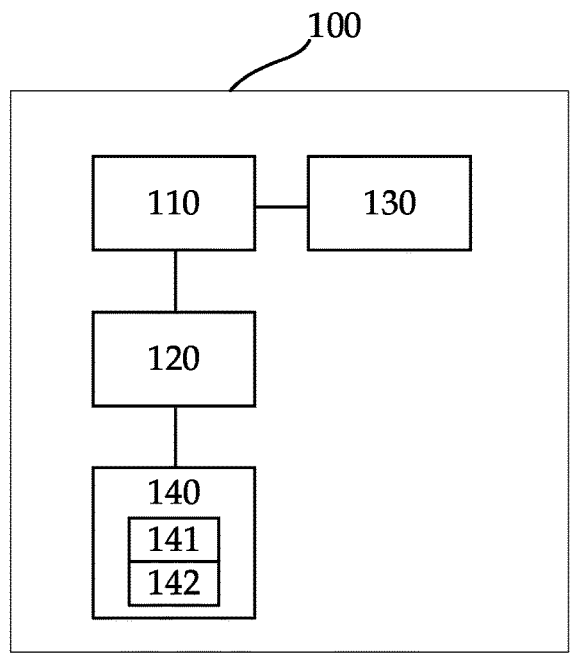

FIG. 1

| responsive to the electronic device detecting that the electronic device receives a voice communication service, detecting an operation state of the camera | S201 |

| responsive to detecting, by the electronic device, that the camera of the electronic device is activated, detecting whether electromagnetic interference occurs between the camera and the radio frequency system of the electronic device | S202 |

| if yes, responsive to determining that the currently activated antenna is the first antenna, transmitting, by the electronic device, a first preset instruction to the modem by means of the application processor | S203 |

| receiving, by the electronic device, the first preset instruction by means of the modem to switch the activated antenna from the first antenna to the second antenna | S204 |

FIG. 2

ELECTROMAGNETIC INTERFERENCE CONTROL METHOD AND RELATED DEVICE

CROSS REFERENCE TO RELATED APPLICATIONS

This application is a continuation of International Application No. PCT/CN2019/103743, filed on Aug. 30, 2019, which claims priority to Chinese Application No. 201811473998.1, filed on Dec. 4, 2018, the entire contents of which are incorporated herein by reference.

BACKGROUND

The present disclosure relates to electronic device technologies, and more particularly to an electromagnetic interference control method and a related device.

Nowadays, with continuous development of electronic device technologies, people's requirements for electronic device functions are gradually increasing, and electromagnetic interference has always been an important fact affecting relevant functions of electronic devices. The electromagnetic interference includes not only the interference between radio frequency components, but also the interference between the radio frequency components and other components of the electronic device.

SUMMARY

Embodiments of the present disclosure provide an electromagnetic interference control method and a related device, for reducing camera screen crash or jam, thereby improving image quality of electronic devices.

In a first aspect, embodiments of the present disclosure provide an electromagnetic interference control method, wherein the method is applied to an electronic device, which includes an application processor (AP), a modem, a camera and a radio frequency antenna, wherein the radio frequency antenna includes a first antenna and a second antenna, a distance between the first antenna and the camera is less than a distance between the second antenna and the camera, the AP is connected to the modem and the camera, and the modem is connected to the radio frequency antenna, the method including responsive to detecting that the electronic device receives a voice communication service, detecting an operation state of the camera; responsive to detecting that the camera of the electronic device is activated, detecting whether electromagnetic interference occurs between the camera and a radio frequency system of the electronic device; if yes, responsive to determining that the first antenna is a currently activated antenna, transmitting a first preset instruction to the modem by means of the application processor; and receiving the first preset instruction by means of the modem to switch from the first antenna to the second antenna and serve the second antenna as an activated antenna, wherein the detecting whether the electromagnetic interference occurs between the camera and the radio frequency system of the electronic device includes obtaining at least one detected value of a communication frequency of the radio frequency system and at least one detected value of a corresponding phase-locked loop (PLL) frequency at which the camera operates; and detecting whether the electromagnetic interference occurs in the electronic device according to the at least one detected value of the communication frequency and the at least one detected value of the PLL frequency.

In a second aspect, embodiments of the present disclosure provide an electronic device, which includes a processor, a storage, a communication interface and one or more programs, wherein the one or more programs are stored in the storage and are configured to be executed by the processor, and the one or more programs include instructions configured to execute the steps of any of the methods according to the first aspect of the embodiments of the present disclosure.

In a third aspect, embodiments of the present disclosure provide a non-transitory computer-readable storage medium, wherein the computer readable storage medium stores a computer program for electronic data exchange, and the computer program enables a computer to execute a part of or all of the steps of any of the methods according to the first aspect of the embodiments of the present disclosure.

BRIEF DESCRIPTION OF THE DRAWINGS

For explaining the technical solutions used in the existing arts or the embodiments of the present disclosure more clearly, the appending figures to be used in describing the existing arts or the embodiments will be briefly introduced below. Obviously, the appending figures described below are only some of the embodiments of the present disclosure, and those of ordinary skill in the art can further obtain other figures according to these figures without making any inventive effort.

FIG. 1 is a structural schematic diagram illustrating an electronic device provided in an embodiment of the present disclosure.

FIG. 2 is a flowchart of an electromagnetic interference control method provided in an embodiment of the present disclosure.

DETAILED DESCRIPTION

Figure 3:
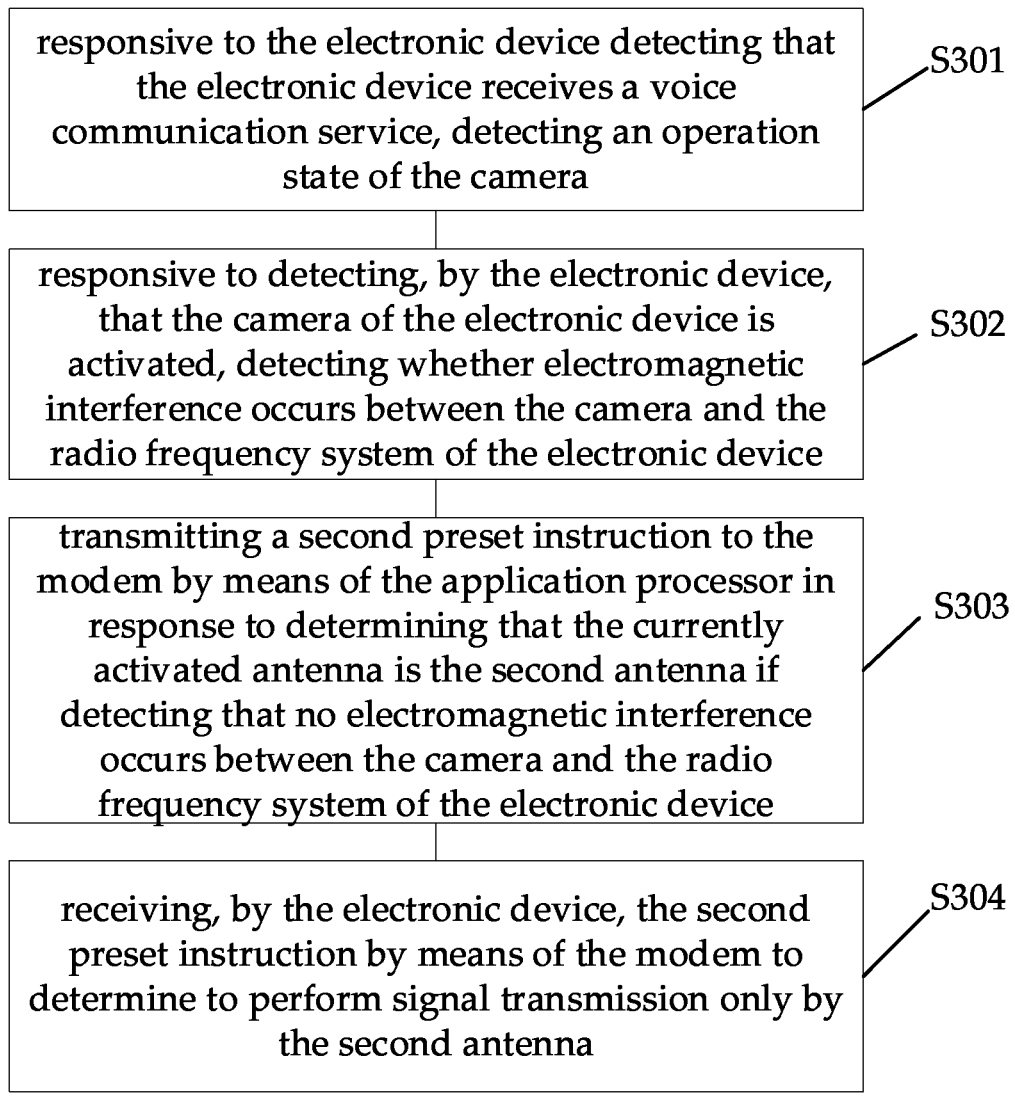
FIG. 3 is a flowchart of another electromagnetic interference control method provided in an embodiment of the present disclosure.

To make those of ordinary skill in the art better understand the schemes of the present disclosure, the technical solutions in the embodiments of the present disclosure are clearly and completely described below with reference to appending drawings of the embodiments of the present disclosure. Obviously, the described embodiments are merely a part of embodiments of the present disclosure and are not all of the embodiments. Based on the embodiments of the present disclosure, all the other embodiments obtained by those of ordinary skill in the art without making any inventive effort are within the scope sought to be protected in the present disclosure.

It should be noted that in the specification, claims, and accompanying drawings of the present disclosure, the terms "first", "second", and so on are intended to distinguish between different objects rather than to indicate a specific order. Moreover, the terms "include", "have" and any other variants mean to cover the non-exclusive inclusion. For example, in the context of a process, method, system, product or device that includes a series of steps or units, the process, method, system, product or device is not necessarily limited to the listed steps or units, instead, optionally includes other steps or units not specified, or may optionally include inherent steps or units of the process, method, product, or device.

The term "embodiment" or "implementation" referred to herein means that a particular feature, structure or property described in conjunction with the embodiment may be contained in at least one embodiment of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the embodiments of the present disclosure may be an electronic device equipped with a camera and having a radio frequency calling functionality. The electronic devices may include various communication capacity equipped hand-held devices, on-vehicle devices, wearable devices, computing devices or other processing devices connected to a wireless modem, as well as various forms of user equipments (UEs), mobile stations (MSs), terminal devices and the like.

At present, when the camera and a radio frequency system of the electronic device are operating at the same time, operating frequencies of the radio frequency system at certain frequency bands may cause electromagnetic interference on the camera, resulting in camera screen crash or jam in the course of previewing or photographing. In the existing arts, the impact of radio frequency on operations of the camera is reduced by improving protection or shielding for camera signal transmission lines; however, hardware cost increases.

For above problem, embodiments of the present disclosure provide an electromagnetic interference control method. The embodiments of the present disclosure will be described in detail below with reference to accompanying drawings.

FIG. 1 is a schematic structural diagram illustrating an electronic device. The electronic device 100 includes an application processor (AP) 110, a modem equipment's 120, a camera 130, and a radio frequency antenna 140. The radio frequency antenna 140 includes a first antenna 141 and a second antenna 142. The distance between the first antenna and the camera is less than the distance between the second antenna and the camera. The radio frequency antenna is configured to transmit and receive information or realize transmission and reception of signals during a call.

FIG. 2 is a flowchart of an electromagnetic interference control method provided in an embodiment of the present disclosure. The method is applied to an electronic device, which includes an application processor (AP), a modem, a camera and a radio frequency. The radio frequency antenna includes a first antenna and a second antenna. The distance between the first antenna and the camera is less than the distance between the second antenna and the camera. The AP is connected to the modem and the camera. The modem is connected to the radio frequency antenna. As shown in the figure, the electromagnetic interference control method includes (S201) responsive to the electronic device detecting that the electronic device receives a voice communication service, detecting an operation state of the camera.

The operation state of the camera includes an activated state and a deactivated state. The voice communication service may correspond to making a phone call and receiving an incoming call and in more specific, may include transmission and reception of voice communication signals during a call carried out by the radio frequency system. Specifically, detecting whether the camera of the electronic device is activated may be realized by detecting whether a user clicks on a corresponding button or application or by detecting whether a button for quickly launching a photographing function is clicked. For instance, it is detected whether a user clicks on a camera application so as to determine whether the user activates the camera.

(S202) Responsive to detecting, by the electronic device, that the camera of the electronic device is activated, detecting whether electromagnetic interference occurs between the camera and the radio frequency system of the electronic device. When the camera operates at the highest frame rate, the corresponding phase-locked loop (PLL) frequency will overlap with the operating frequencies of the radio frequency system at certain frequency bands such that an interference to the camera is caused. Specifically, it is detected whether an operating antenna used in a voice communication event causes an interference to the camera by means of detecting the PLL frequency and the operating frequency. Alternatively, it is detected whether the operating frequency of the radio frequency causes an interference to the current camera by directly detecting whether screen crash or jam occurs using the camera.

(S203) If yes, responsive to determining that the currently activated antenna is the first antenna, transmitting, by the electronic device, a first preset instruction to the modem by means of the application processor. The currently activated antenna is an operating antenna performing signal transmission for the current call. When an interference is caused between the operating antenna performing the signal transmission and the camera and it is determined that the currently activated antenna is the first antenna closer to the camera, a first preset instruction is transmitted to the modem by means of the AP. The first preset instruction includes a notification to the modem to perform an antenna switching operation.

(S204) Receiving, by the electronic device, the first preset instruction by means of the modem to switch the activated antenna from the first antenna to the second antenna. In a specific implementation, based on the first preset instruction, the modem switches the currently activated antenna to the second antenna that is located relatively away from the camera, so as to prevent the first antenna from interfering with the camera.

It can be seen that in the embodiment of the present disclosure, responsive to the electronic device detecting that the electronic device receives a voice communication service, an operation state of the camera is detected first. Then, responsive to detecting, by the electronic device, that the camera of the electronic device is activated, it is to detect whether electromagnetic interference occurs between the camera and the radio frequency system of the electronic device. if yes, responsive to determining that the first antenna is a currently activated antenna, transmitting a first preset instruction to the modem by means of the application processor; and Finally, the electronic device receives the first preset instruction by means of the modem to switch the activated antenna from the first antenna to the second antenna. As can be seen, the electronic device can detect interferences caused between the operating frequency of the radio frequency antenna and the PLL frequency of the camera in the course that the electronic device receives the voice communication service. Further, the activated antenna is switched to the antenna with a small amount of interferences. In such a way, the electromagnetic interference between the camera and the radio frequency antenna used for data transmission of the voice communication is reduced, efficiency of radio frequency communication is improved, and inferences caused by the radio frequency system to the phone camera are effectively reduced. This reduces camera screen crash or jam and improves image quality of the electronic device.

In one possible embodiment, the method further includes detecting an operating frequency band of the first antenna in response to determining that the currently activated antenna is the first antenna if detecting that no electromagnetic interference occurs between the camera and the radio frequency system of the electronic device; determining to perform signal transmission using only the operating frequency band; or, transmitting the first preset instruction to the modem by means of the application processor; receiving the first preset instruction by means of the modem to switch from the first antenna to the second antenna and serve the second antenna as an activated antenna.

Optionally, the first preset instruction includes a notification to the modem to perform an antenna switching operation.

A radio frequency top antenna of the cell phone is located closer to a rear camera. Transmission power of this antenna will cause an interference on an imaging process of the camera when the operating radio frequency band overlaps with a corresponding PLL frequency at which the camera operates, and will not cause an interference to the camera when the operating frequency band does not overlap with a corresponding PLL frequency at which the camera operates. Accordingly, when it is detected that no electromagnetic interference occurs, a current operating frequency of the first antenna is determined and the operating frequency at which the first antenna performs signal transmission is fixed and serves as the current operating frequency.

Because the first antenna is located closer to the camera and the second antenna is located relatively away from the camera, interference on the camera may easily occur when the antenna performing the signal transmission is the first antenna. Accordingly, when it is detected that the currently operating antenna is the first antenna, switch to the second antenna and fix it.

It can be seen that in the present embodiment, by adjusting the operating frequency of the first antenna or switching from the first antenna to the second antenna, the electronic device can ensure that the camera will not be interfered by the operating frequency of the first antenna.

In one possible embodiment, the method further includes determining that the currently activated primary antenna is the second antenna if detecting that no electromagnetic interference occurs between the camera and the radio frequency system of the electronic device; transmitting a second preset instruction to the modem by means of the application processor; receiving the second preset instruction by means of the modem to determine to perform signal transmission only by the second antenna.

The second preset instruction is used for the electronic device to fix at the second antenna, that is, the antenna operating for the voice communication service is set to the second antenna only, and the operating antenna will not be switched between the first antenna and the second antenna.

In a specific implementation, by detecting the situation regarding the interference between the camera and the radio frequency system, it is determined which antenna is to be currently activated. When the currently activated antenna is distanced from the camera, an instruction to fix at the current antenna is transmitted to the modem by means of the application processor such that data or signal transmission is performed only by the current antenna at a distant location in the course of the voice communication event.

It can be seen that in the present embodiment, the electronic device can determine the location of the currently activated antenna based on the situation regarding the interference between the camera and the radio frequency system of the electronic device, and transmit a preset instruction based on the antenna location, thereby ensuring that the interference between the camera and the radio frequency system is reduced to a minimum, and maintaining stability of photographing using the camera and image clearness.

In one possible embodiment, the method further includes adjusting an operating frame rate of the camera to reduce or avoid the electromagnetic interference between the camera and the radio frequency system, in response to determining that the currently activated antenna is the second antenna if detecting that the electromagnetic interference occurs between the camera and the radio frequency system of the electronic device; transmitting a second preset instruction to the modem by means of the application processor; receiving the second preset instruction by means of the modem to determine to perform signal transmission only by the second antenna.

The main reason for the generation of electromagnetic interference is that when the camera operates at the highest frame rate, the corresponding phase-locked loop (PLL) frequency will overlap with the operating frequencies of the radio frequency system at certain frequency bands. Accordingly, when the activated antenna is the second antenna, the corresponding PLL frequency is adjusted by changing the operating frame rate of the camera so as to reduce or avoid the electromagnetic interference between the camera and the second antenna.

In one possible embodiment, after fixing at the second antenna is performed, the method further includes detecting, by the application processor, whether the camera is activated; if no, transmitting a third preset instruction to the modem by means of the application processor; and receiving the third preset instruction by means of the modem to recover an ability to switch between the first antenna and the second antenna.

The third preset instruction is configured to recover an ability to switch between the first antenna and the second antenna.

In a specific implementation, after it is fixed at the second antenna, the operation state of the camera is detected again. If the camera is in the activated state, continue to fix at the second antenna and serve it as the operating antenna for the voice communication event; if the camera is deactivated, the operating antenna for the voice communication event is recovered to be in a free-to-be-switched statue to improve voice communication quality.

It can be seen that in the present embodiment, the electronic device can detect the operation state of the camera in real time or at regular intervals within a duration of the voice communication event, and adjust the operating antenna for the voice communication event such that within the duration of the voice communication event, the electronic device can freely switch or change the operating antenna for the voice communication event, thereby improving efficiency and quality of voice communication signal transmission.

In one possible embodiment, the detecting whether the electromagnetic interference occurs between the camera and the radio frequency system of the electronic device includes obtaining at least one detected value of a communication frequency of the radio frequency system and at least one detected value of a corresponding PLL frequency at which the camera operates; detecting whether the electromagnetic interference occurs in the electronic device according to the at least one detected value of the communication frequency and the at least one detected value of the PLL frequency.

In a specific implementation, the electronic device compares the detected values of the PLL frequency and the detected values of the communication frequency one by one so as to determine whether the electromagnetic interference occurs.

It can be seen that in the present embodiment, based on the frequency comparison, the electronic device can determine whether the electromagnetic interference occurs between the PLL frequency corresponding to the operating frequency of the camera and the communication frequency of the operating antenna activated by the radio frequency system. It can be determined an electromagnetic interfering frequency based on the detected values obtained in real time. The detection is high in efficiency and it is fast.

In one possible embodiment, the detecting whether the electromagnetic interference occurs in the electronic device according to the at least one detected value of the communication frequency and the at least one detected value of the PLL frequency includes determining a communication frequency set according to the at least one detected value of the communication frequency, wherein the communication frequency set includes at least one communication frequency of the radio frequency system; determining a PLL frequency set according to the at least one detected value of the PLL frequency, wherein the PLL frequency set includes at least one PLL frequency; detecting whether the electromagnetic interference occurs in the electronic device based on a ratio of the communication frequency set overlapping with the PLL frequency set.

In a specific implementation, the electronic device may compare the frequencies in the communication frequency set with each frequency in the PLL frequency set one by one. If there is an interfering frequency, it is determined that the electromagnetic interference occurs; if there is no interfering frequency, it is determined that the electromagnetic interference does not occur.

It can be seen that in the present embodiment, by comparing the frequencies in the PLL frequency set with the frequencies in the communication frequency set, the electronic device can accurately and comprehensively detect whether the electromagnetic interference occurs, thereby improving accuracy and comprehensiveness of the detection.

In one possible embodiment, the obtaining the at least one detected value of the communication frequency and the at least one detected value of the corresponding PLL frequency includes controlling the modem to execute the operations of obtaining the at least one detected value of the communication frequency and reporting the at least one detected value of the communication frequency to the application processor via a preset channel; controlling the application processor to execute the operations of receiving the at least one detected value of the communication frequency from the modem and obtaining the at least one detected value of the PLL frequency; the detecting whether the electromagnetic interference occurs in the electronic device according to the at least one detected value of the communication frequency and the at least one detected value of the PLL frequency includes controlling the AP to detect whether the electromagnetic interference occurs in the electronic device according to the at least one detected value of the communication frequency and the at least one detected value of the PLL frequency.

The preset channel is a cross-core communication interface (CCCI) channel between the modem and the AP.

In a specific implementation, the modem of the electronic device can interact with the AP to realize the detection of electromagnetic interference. Specifically, the modem captures the at least one detected value of the communication frequency and transmits it to the AP, and the AP determine whether the electromagnetic interference occurs in accompanying with a detected PLL frequency. The AP has an excellent processing capacity and thus can detect the electromagnetic interference quickly and efficiently.

FIG. 3, consistent with the embodiment shown in FIG. 2, is a flowchart of an electromagnetic interference control method provided in an embodiment of the present disclosure. The method is applied to an electronic device, which includes an application processor (AP), a modem, a camera and a radio frequency. The radio frequency antenna includes a first antenna and a second antenna. The distance between the first antenna and the camera is less than the distance between the second antenna and the camera. The AP is connected to the modem and the camera. The modem is connected to the radio frequency antenna. As shown in the figure, the electromagnetic interference control method includes (S301) responsive to the electronic device detecting that the electronic device receives a voice communication service, detecting an operation state of the camera; (S302) responsive to detecting, by the electronic device, that the camera of the electronic device is activated, detecting whether electromagnetic interference occurs between the camera and the radio frequency system of the electronic device; (S303) transmitting a second preset instruction to the modem by means of the application processor in response to determining that the currently activated antenna is the second antenna if detecting that no electromagnetic interference occurs between the camera and the radio frequency system of the electronic device; and (S304) receiving, by the electronic device, the second preset instruction by means of the modem to determine to perform signal transmission only by the second antenna.

It can be seen that in the embodiment of the present disclosure, responsive to the electronic device detecting that the electronic device receives a voice communication service, an operation state of the camera is detected first. Then, responsive to detecting, by the electronic device, that the camera of the electronic device is activated, it is to detect whether electromagnetic interference occurs between the camera and the radio frequency system of the electronic device. if yes, responsive to determining that the first antenna is a currently activated antenna, transmitting a first preset instruction to the modem by means of the application processor; and Finally, the electronic device receives the first preset instruction by means of the modem to switch the activated antenna from the first antenna to the second antenna. As can be seen, the electronic device can detect interferences caused between the operating frequency of the radio frequency antenna and the PLL frequency of the camera in the course that the electronic device receives the voice communication service. Further, the activated antenna is switched to the antenna with a small amount of interferences. In such a way, the electromagnetic interference between the camera and the radio frequency antenna used for data transmission of the voice communication is reduced, efficiency of radio frequency communication is improved, and inferences caused by the radio frequency system to the phone camera are effectively reduced. This reduces camera screen crash or jam and improves image quality of the electronic device.

In addition, the electronic device can determine the location of the currently activated antenna based on the situation regarding the interference between the camera and the radio frequency system of the electronic device, and transmit a preset instruction based on the antenna location, thereby ensuring that the interference between the camera and the radio frequency system is reduced to a minimum, and maintaining stability of photographing using the camera and image clearness.

Figure 4:
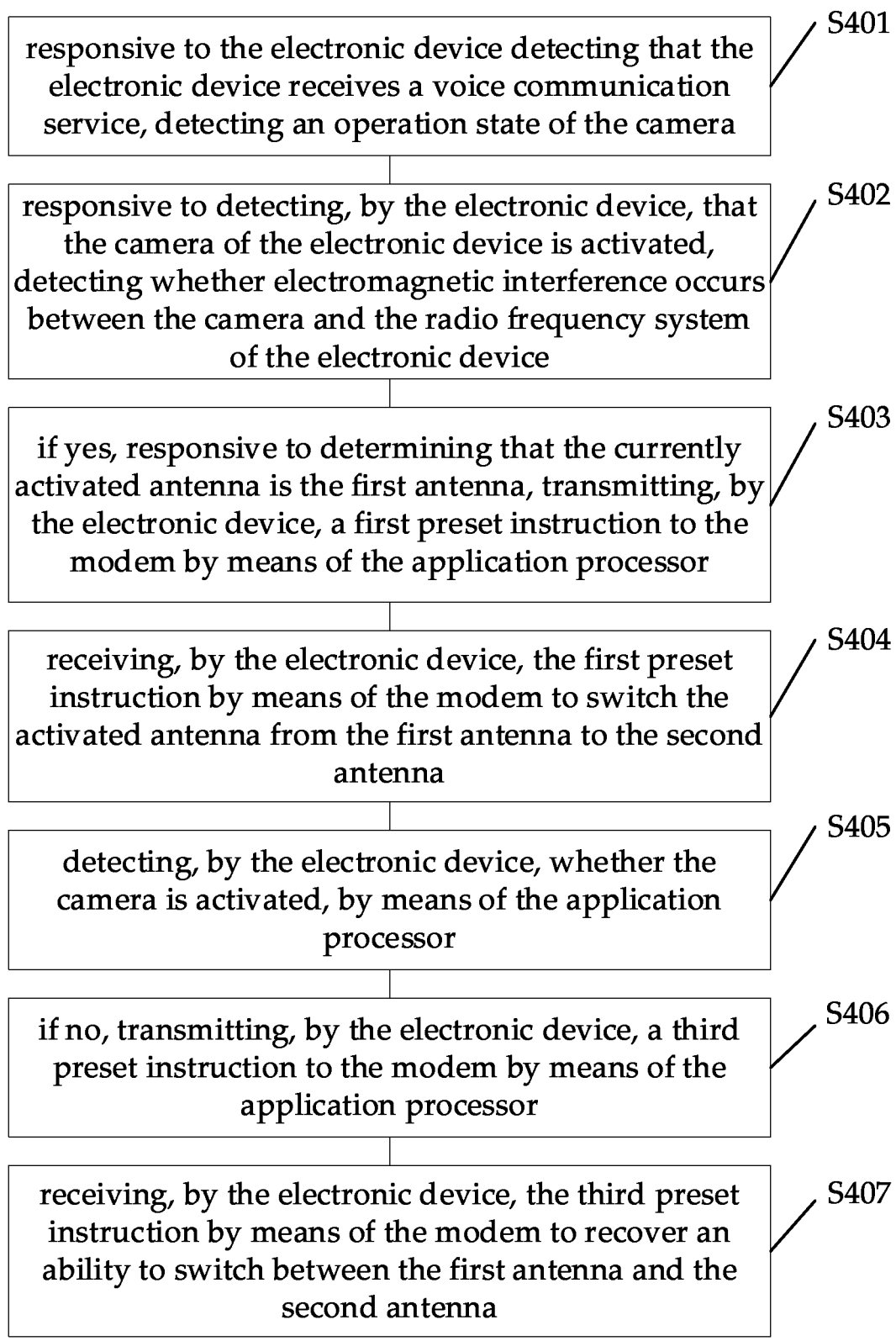
FIG. 4 is a flowchart of yet another electromagnetic interference control method provided in an embodiment of the present disclosure.

FIG. 4, consistent with the embodiment shown in FIG. 2, is a flowchart of an electromagnetic interference control method provided in an embodiment of the present disclosure. The method is applied to an electronic device, which includes an application processor (AP), a modem, a camera and a radio frequency. The radio frequency antenna includes a first antenna and a second antenna. The distance between the first antenna and the camera is less than the distance between the second antenna and the camera. The AP is connected to the modem and the camera. The modem is connected to the radio frequency antenna. As shown in the figure, the electromagnetic interference control method includes (S401) responsive to the electronic device detecting that the electronic device receives a voice communication service, detecting an operation state of the camera; (S402) responsive to detecting, by the electronic device, that the camera of the electronic device is activated, detecting whether electromagnetic interference occurs between the camera and the radio frequency system of the electronic device; (S403) if yes, responsive to determining that the currently activated antenna is the first antenna, transmitting, by the electronic device, a first preset instruction to the modem by means of the application processor; (S404) receiving, by the electronic device, the first preset instruction by means of the modem to switch the activated antenna from the first antenna to the second antenna; (S405) detecting, by the electronic device, whether the camera is activated, by means of the application processor; (S406) if no, transmitting, by the electronic device, a third preset instruction to the modem by means of the application processor; and (S407) receiving, by the electronic device, the third preset instruction by means of the modem to recover an ability to switch between the first antenna and the second antenna.

It can be seen that in the embodiment of the present disclosure, responsive to the electronic device detecting that the electronic device receives a voice communication service, an operation state of the camera is detected first. Then, responsive to detecting, by the electronic device, that the camera of the electronic device is activated, it is to detect whether electromagnetic interference occurs between the camera and the radio frequency system of the electronic device. if yes, responsive to determining that the first antenna is a currently activated antenna, transmitting a first preset instruction to the modem by means of the application processor; and Finally, the electronic device receives the first preset instruction by means of the modem to switch the activated antenna from the first antenna to the second antenna. As can be seen, the electronic device can detect interferences caused between the operating frequency of the radio frequency antenna and the PLL frequency of the camera in the course that the electronic device receives the voice communication service. Further, the activated antenna is switched to the antenna with a small amount of interferences. In such a way, the electromagnetic interference between the camera and the radio frequency antenna used for data transmission of the voice communication is reduced, efficiency of radio frequency communication is improved, and inferences caused by the radio frequency system to the phone camera are effectively reduced. This reduces camera screen crash or jam and improves image quality of the electronic device.

In addition, the electronic device can detect the operation state of the camera in real time or at regular intervals within a duration of the voice communication event, and adjust the operating antenna for the voice communication event such that within the duration of the voice communication event, the electronic device can freely switch or change the operating antenna for the voice communication event, thereby improving efficiency and quality of voice communication signal transmission.

Figure 5:
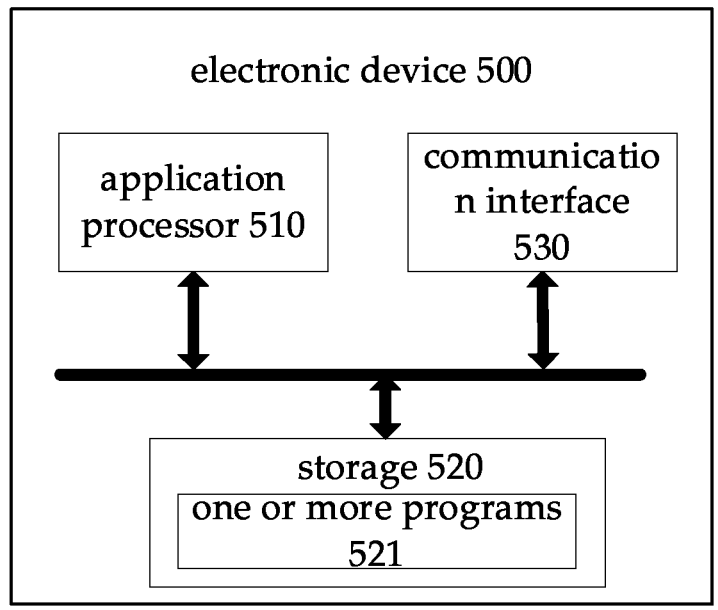
FIG. 5 is a structural schematic diagram illustrating an electronic device provided in an embodiment of the present disclosure.

FIG. 5, consistent with the embodiments shown in FIGS. 2, 3 and 4, is a schematic diagram illustrating an electronic device 500 provided in an embodiment of the present disclosure. As shown in the figure, the electronic device 500 includes an application processor 510, a storage 520, a communication interface 530 and one or more programs 521, wherein the one or more programs 521 are stored in the storage 520 and are configured to be executed by the application processor 510, and the one or more programs 521 include instructions configured to execute the steps of responsive to detecting that the electronic device receives a voice communication service, detecting an operation state of the camera; responsive to detecting that the camera of the electronic device is activated, detecting whether electromagnetic interference occurs between the camera and the radio frequency system of the electronic device; if yes, responsive to determining that the first antenna is a currently activated antenna, transmitting a first preset instruction to the modem by means of the application processor; and receiving the first preset instruction by means of the modem to switch from the first antenna to the second antenna and serve the second antenna as an activated antenna.

It can be seen that in the embodiment of the present disclosure, responsive to the electronic device detecting that the electronic device receives a voice communication service, an operation state of the camera is detected first. Then, responsive to detecting, by the electronic device, that the camera of the electronic device is activated, it is to detect whether electromagnetic interference occurs between the camera and the radio frequency system of the electronic device. if yes, responsive to determining that the first antenna is a currently activated antenna, transmitting a first preset instruction to the modem by means of the application processor; and Finally, the electronic device receives the first preset instruction by means of the modem to switch the activated antenna from the first antenna to the second antenna. As can be seen, the electronic device can detect interferences caused between the operating frequency of the radio frequency antenna and the PLL frequency of the camera in the course that the electronic device receives the voice communication service. Further, the activated antenna is switched to the antenna with a small amount of interferences. In such a way, the electromagnetic interference between the camera and the radio frequency antenna used for data transmission of the voice communication is reduced, efficiency of radio frequency communication is improved, and inferences caused by the radio frequency system to the phone camera are effectively reduced. This reduces camera screen crash or jam and improves image quality of the electronic device.

In one possible embodiment, the programs further include instructions configured to execute the operations of detecting an operating frequency band of the first antenna in response to determining that the currently activated antenna is the first antenna if detecting that no electromagnetic interference occurs between the camera and the radio frequency system of the electronic device; determining to perform signal transmission using only the operating frequency band; or, transmitting the first preset instruction to the modem by means of the application processor; receiving the first preset instruction by means of the modem to switch from the first antenna to the second antenna and serve the second antenna as an activated antenna.

In one possible embodiment, the programs further include instructions configured to execute the operations of determining that the currently activated primary antenna is the second antenna if detecting that no electromagnetic interference occurs between the camera and the radio frequency system of the electronic device; transmitting a second preset instruction to the modem by means of the application processor; receiving the second preset instruction by means of the modem to determine to perform signal transmission only by the second antenna.

In one possible embodiment, the programs further include instructions configured to execute the operations of adjusting an operating frame rate of the camera to reduce or avoid the electromagnetic interference between the camera and the radio frequency system, in response to determining that the currently activated antenna is the second antenna if detecting that the electromagnetic interference occurs between the camera and the radio frequency system of the electronic device; transmitting a second preset instruction to the modem by means of the application processor; receiving the second preset instruction by means of the modem to determine to perform signal transmission only by the second antenna.

In one possible embodiment, the programs further include instructions configured to execute the operations of detecting, after fixing at the second antenna is executed, by means of the application processor, whether the camera is activated; if no, transmitting a third preset instruction to the modem by means of the application processor; and receiving the third preset instruction by means of the modem to recover an ability to switch between the first antenna and the second antenna.

In one possible embodiment, in the detecting whether the electromagnetic interference occurs between the camera and the radio frequency system of the electronic device, the instructions of the programs are configured to execute the operations of obtaining at least one detected value of a communication frequency of the radio frequency system and at least one detected value of a corresponding PLL frequency at which the camera operates; detecting whether the electromagnetic interference occurs in the electronic device according to the at least one detected value of the communication frequency and the at least one detected value of the PLL frequency.

In one possible embodiment, in the detecting whether the electromagnetic interference occurs in the electronic device according to the at least one detected value of the communication frequency and the at least one detected value of the PLL frequency, the instructions of the programs are configured to execute the operations of determining a communication frequency set according to the at least one detected value of the communication frequency, wherein the communication frequency set includes at least one communication frequency of the radio frequency system; determining a PLL frequency set according to the at least one detected value of the PLL frequency, wherein the PLL frequency set includes at least one PLL frequency; and detecting whether the electromagnetic interference occurs in the electronic device based on a ratio of the communication frequency set overlapping with the PLL frequency set.

In one possible embodiment, in the obtaining the at least one detected value of the communication frequency and the at least one detected value of the PLL frequency, the instructions of the programs are configured to execute the operations of controlling the modem to execute the operations of obtaining the at least one detected value of the communication frequency and reporting the at least one detected value of the communication frequency to the application processor via a preset channel; controlling the application processor to execute the operations of receiving the at least one detected value of the communication frequency from the modem and obtaining the at least one detected value of the PLL frequency; the detecting whether the electromagnetic interference occurs in the electronic device according to the at least one detected value of the communication frequency and the at least one detected value of the PLL frequency includes controlling the AP to detect whether the electromagnetic interference occurs in the electronic device according to the at least one detected value of the communication frequency and the at least one detected value of the PLL frequency.

In one possible embodiment, the first preset instruction includes a notification to the modem to perform an antenna switching operation.

The foregoing technical solutions of implementations of the disclosure are mainly described from a perspective of execution of the method. It can be understood that, in order to implement the above functions, the electronic device includes hardware structures and/or software modules for performing respective functions. Those of ordinary skill in the art will appreciate that units and algorithmic operations of various examples described in connection with implementations herein can be implemented in hardware or a combination of computer software and hardware. Whether these functions are implemented by means of hardware or computer software driving hardware depends on the particular application and the design constraints of the associated technical solution. For a specific application, those skilled in the art may use different methods to implement the described functionality, but such implementation should not be regarded as beyond the scope of the disclosure.

In implementations of the present disclosure, the electronic device can be divided into different functional units according to the above method implementations. For example, the electronic device can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 6:
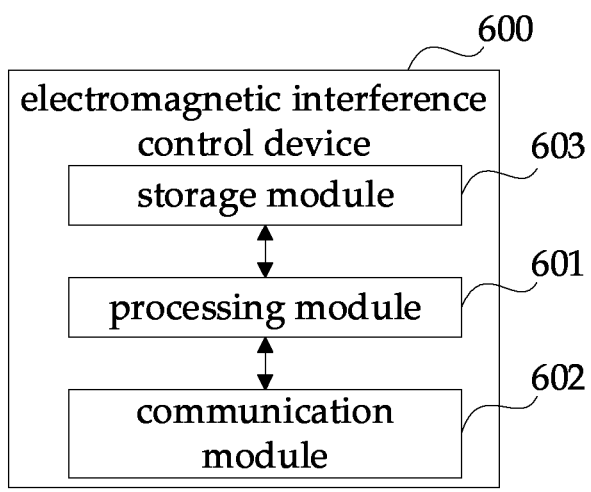
FIG. 6 is a block diagram illustrating functional units of an electromagnetic interference control device provided in an embodiment of the present disclosure.

FIG. 6 is a block diagram illustrating functional units of an electromagnetic interference control device 600 provided in an embodiment of the present disclosure. The electromagnetic interference control device 600 is applied to an electronic device, which includes an application processor (AP), a modem, a camera and a radio frequency antenna, wherein the radio frequency antenna includes a first antenna and a second antenna, a distance between the first antenna and the camera is less than a distance between the second antenna and the camera, the AP is connected to the modem and the camera, and the modem is connected to the radio frequency antenna. The electromagnetic interference control device includes a processing unit 601 and a communication unit 602.

The processing unit 601 is configured for, responsive to detecting that the electronic device receives a voice communication service, detecting an operation state of the camera; and The processing unit 601 is configured for, responsive to detecting that the camera of the electronic device is activated, detecting whether electromagnetic interference occurs between the camera and the radio frequency system of the electronic device; if yes, responsive to determining that the first antenna is a currently activated antenna, transmitting a first preset instruction to the modem by means of the application processor; and receiving the first preset instruction by means of the modem to switch from the first antenna to the second antenna and serve the second antenna as an activated antenna.

The electromagnetic interference control device 600 may further include a storage unit 603 configured to store program codes and data of the electronic device. The processing unit 601 can be a processor, the communication unit 602 can be a touch display screen or a transceiver, and the storage unit 603 can be a storage.

It can be seen that in the embodiment of the present disclosure, responsive to the electronic device detecting that the electronic device receives a voice communication service, an operation state of the camera is detected first. Then, responsive to detecting, by the electronic device, that the camera of the electronic device is activated, it is to detect whether electromagnetic interference occurs between the camera and the radio frequency system of the electronic device. if yes, responsive to determining that the first antenna is a currently activated antenna, transmitting a first preset instruction to the modem by means of the application processor; and Finally, the electronic device receives the first preset instruction by means of the modem to switch the activated antenna from the first antenna to the second antenna. As can be seen, the electronic device can detect interferences caused between the operating frequency of the radio frequency antenna and the PLL frequency of the camera in the course that the electronic device receives the voice communication service. Further, the activated antenna is switched to the antenna with a small amount of interferences. In such a way, the electromagnetic interference between the camera and the radio frequency antenna used for data transmission of the voice communication is reduced, efficiency of radio frequency communication is improved, and inferences caused by the radio frequency system to the phone camera are effectively reduced. This reduces camera screen crash or jam and improves image quality of the electronic device.

In one possible embodiment, the processing unit 601 is further configured for detecting an operating frequency band of the first antenna in response to determining that the currently activated antenna is the first antenna if detecting that no electromagnetic interference occurs between the camera and the radio frequency system of the electronic device; determining to perform signal transmission using only the operating frequency band; or, transmitting the first preset instruction to the modem by means of the application processor; receiving the first preset instruction by means of the modem to switch from the first antenna to the second antenna and serve the second antenna as an activated antenna.

In one possible embodiment, the processing unit 601 is further configured for determining that the currently activated primary antenna is the second antenna if detecting that no electromagnetic interference occurs between the camera and the radio frequency system of the electronic device; transmitting a second preset instruction to the modem by means of the application processor; receiving the second preset instruction by means of the modem to determine to perform signal transmission only by the second antenna.

In one possible embodiment, the processing unit 601 is further configured for adjusting an operating frame rate of the camera to reduce or avoid the electromagnetic interference between the camera and the radio frequency system, in response to determining that the currently activated antenna is the second antenna if detecting that the electromagnetic interference occurs between the camera and the radio frequency system of the electronic device; transmitting a second preset instruction to the modem by means of the application processor; receiving the second preset instruction by means of the modem to determine to perform signal transmission only by the second antenna.

In one possible embodiment, the processing unit 601 is further configured for detecting, after fixing at the second antenna is performed, by the application processor, whether the camera is activated; if no, transmitting a third preset instruction to the modem by means of the application processor; and receiving the third preset instruction by means of the modem to recover an ability to switch between the first antenna and the second antenna.

In one possible embodiment, in the detecting whether the electromagnetic interference occurs between the camera and the radio frequency system of the electronic device, the processing unit 601 is further configured for obtaining at least one detected value of a communication frequency of the radio frequency system and at least one detected value of a corresponding PLL frequency at which the camera operates; detecting whether the electromagnetic interference occurs in the electronic device according to the at least one detected value of the communication frequency and the at least one detected value of the PLL frequency.

In one possible embodiment, in the detecting whether the electromagnetic interference occurs in the electronic device according to the at least one detected value of the communication frequency and the at least one detected value of the PLL frequency, the processing unit 601 is further configured for determining a communication frequency set according to the at least one detected value of the communication frequency, wherein the communication frequency set includes at least one communication frequency of the radio frequency system; determining a PLL frequency set according to the at least one detected value of the PLL frequency, wherein the PLL frequency set includes at least one PLL frequency; and detecting whether the electromagnetic interference occurs in the electronic device based on a ratio of the communication frequency set overlapping with the PLL frequency set.

In one possible embodiment, in the obtaining the at least one detected value of the communication frequency and the at least one detected value of the corresponding PLL frequency, the processing unit 601 is further configured for controlling the modem to execute the operations of obtaining the at least one detected value of the communication frequency and reporting the at least one detected value of the communication frequency to the application processor via a preset channel; controlling the application processor to execute the operations of receiving the at least one detected value of the communication frequency from the modem and obtaining the at least one detected value of the PLL frequency; the detecting whether the electromagnetic interference occurs in the electronic device according to the at least one detected value of the communication frequency and the at least one detected value of the PLL frequency includes controlling the AP to detect whether the electromagnetic interference occurs in the electronic device according to the at least one detected value of the communication frequency and the at least one detected value of the PLL frequency.

In one possible embodiment, the first preset instruction includes a notification to the modem to perform an antenna switching operation.

Embodiments of the present disclosure further provide a computer readable storage medium, wherein the computer readable storage medium stores a computer program for electronic data exchange, and the computer program enables a computer to execute a part of or all of the steps of any of the methods according to above method embodiments. The aforesaid computer includes the electronic device.

Embodiments of the present disclosure further provide a computer program product, wherein the computer program product includes a non-transitory computer readable storage medium storing computer programs, and the computer programs are operable to enable a computer to execute a part of or all of the steps of any of the methods according to above method embodiments. The computer program product can be a software installation package, and the aforesaid computer includes the electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the application, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The foregoing memory includes any medium that can store program code, such as a USB flash drive, a removable hard disk, a Read-Only Memory (ROM), a Random Access Memory (RAM), a magnetic disk, or an optical disc.

A person of ordinary skill in the art may understand that all or some of the steps in various methods of the foregoing embodiments may be implemented by a program instructing relevant hardware. The program instructions may be stored in a computer readable storage medium. The storage medium may include a flash drive, a read only memory (ROM), a random access memory (RAM), a magnetic disk or an optic disc.

Hereinbefore, the embodiments of the present disclosure are introduced in detail, the principles and implementations of the present disclosure are set forth herein with reference to specific examples, descriptions of the above embodiments are merely served to assist in understanding the technical solutions and essential ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. An electromagnetic interference control method, wherein the method is applied to an electronic device, which comprises an application processor (AP), a modem, a camera and a radio frequency antenna, wherein the radio frequency antenna comprises a first antenna and a second antenna, a distance between the first antenna and the camera is less than a distance between the second antenna and the camera, the AP is connected to the modem and the camera, and the modem is connected to the radio frequency antenna, the method comprising:

responsive to detecting that the electronic device receives a voice communication service, detecting an operation state of the camera;

responsive to detecting that the camera of the electronic device is activated, detecting whether electromagnetic interference occurs between the camera and a radio frequency system of the electronic device;

if yes, responsive to determining that the first antenna is a currently activated antenna, transmitting a first preset instruction to the modem by means of the application processor; and receiving the first preset instruction by means of the modem to switch the activated antenna from the first antenna to the second antenna and fix, wherein the detecting whether the electromagnetic interference occurs between the camera and the radio frequency system of the electronic device comprises:

obtaining at least one detected value of a communication frequency of the radio frequency system and at least one detected value of a corresponding phase-locked loop (PLL) frequency at which the camera operates; and detecting whether the electromagnetic interference occurs in the electronic device according to the at least one detected value of the communication frequency and the at least one detected value of the PLL frequency.

2. The electromagnetic interference control method according to claim 1, further comprising:

detecting an operating frequency band of the first antenna in response to determining that the currently activated antenna is the first antenna if detecting that no electromagnetic interference occurs between the camera and the radio frequency system of the electronic device; and determining to perform signal transmission using only the operating frequency band.

3. The electromagnetic interference control method according to claim 1, further comprising:

transmitting a second preset instruction to the modem by means of the application processor in response to determining that the currently activated antenna is the second antenna if detecting that no electromagnetic interference occurs between the camera and the radio frequency system of the electronic device; and receiving the second preset instruction by means of the modem to determine to perform signal transmission only by the second antenna.

4. The electromagnetic interference control method according to claim 1, further comprising:

transmitting a second preset instruction to the modem by means of the application processor in response to determining that the currently activated antenna is the second antenna if detecting that the electromagnetic interference occurs between the camera and the radio frequency system of the electronic device;

receiving the second preset instruction by means of the modem to determine to perform signal transmission only by the second antenna; and adjusting an operating frame rate of the camera to reduce or avoid the electromagnetic interference between the camera and the radio frequency system.

5. The electromagnetic interference control method according to claim 1, wherein after fixing at the second antenna is executed, the method further comprises:

detecting, by means of the application processor, whether the camera is activated;

if no, transmitting a third preset instruction to the modem by means of the application processor; and receiving the third preset instruction by means of the modem to recover an ability to switch between the first antenna and the second antenna.

6. The electromagnetic interference control method according to claim 1, wherein the detecting whether the electromagnetic interference occurs in the electronic device according to the at least one detected value of the communication frequency and the at least one detected value of the PLL frequency comprises:

determining a communication frequency set according to the at least one detected value of the communication frequency, wherein the communication frequency set comprises at least one communication frequency of the radio frequency system;

determining a PLL frequency set according to the at least one detected value of the PLL frequency, wherein the PLL frequency set comprises at least one PLL frequency; and detecting whether the electromagnetic interference occurs in the electronic device based on a ratio of the communication frequency set overlapping with the PLL frequency set.

7. The electromagnetic interference control method according to claim 1, wherein the obtaining the at least one detected value of the communication frequency and the at least one detected value of the PLL frequency comprises:

controlling the modem to execute the operations of obtaining the at least one detected value of the communication frequency and reporting the at least one detected value of the communication frequency to the application processor via a preset channel; and controlling the application processor to execute the operations of receiving the at least one detected value of the communication frequency from the modem and obtaining the at least one detected value of the PLL frequency, wherein the detecting whether the electromagnetic interference occurs in the electronic device according to the at least one detected value of the communication frequency and the at least one detected value of the PLL frequency comprises:

controlling the AP to detect whether the electromagnetic interference occurs in the electronic device according to the at least one detected value of the communication frequency and the at least one detected value of the PLL frequency.

8. An electronic device, wherein the device comprises a processor, a storage, a communication interface and one or more programs, the one or more programs are stored in the storage and are configured to be executed by the processor, and the one or more programs comprise instructions configured to execute the steps of:

responsive to detecting that the electronic device receives a voice communication service, detecting an operation state of the camera;

responsive to detecting that the camera of the electronic device is activated, detecting whether electromagnetic interference occurs between the camera and a radio frequency system of the electronic device;

if yes, responsive to determining that the first antenna is a currently activated antenna, transmitting a first preset instruction to the modem by means of the application processor; and receiving the first preset instruction by means of the modem to switch the activated antenna from the first antenna to the second antenna and fix, wherein the detecting whether the electromagnetic interference occurs between the camera and the radio frequency system of the electronic device comprises:

obtaining at least one detected value of a communication frequency of the radio frequency system and at least one detected value of a corresponding phase-locked loop (PLL) frequency at which the camera operates; and detecting whether the electromagnetic interference occurs in the electronic device according to the at least one detected value of the communication frequency and the at least one detected value of the PLL frequency.

9. The electronic device according to claim 8, wherein the one or more programs further comprise instructions configured to execute the steps of:

detecting an operating frequency band of the first antenna in response to determining that the currently activated antenna is the first antenna if detecting that no electromagnetic interference occurs between the camera and the radio frequency system of the electronic device; and
determining to perform signal transmission using only the operating frequency band.

10. The electronic device according to claim 8, wherein the one or more programs further comprise instructions configured to execute the steps of:
transmitting a second preset instruction to the modem by means of the application processor in response to determining that the currently activated antenna is the second antenna if detecting that no electromagnetic interference occurs between the camera and the radio frequency system of the electronic device; and
receiving the second preset instruction by means of the modem to determine to perform signal transmission only by the second antenna.

11. The electronic device according to claim 8, wherein the one or more programs further comprise instructions configured to execute the steps of:
transmitting a second preset instruction to the modem by means of the application processor in response to determining that the currently activated antenna is the second antenna if detecting that the electromagnetic interference occurs between the camera and the radio frequency system of the electronic device;
receiving the second preset instruction by means of the modem to determine to perform signal transmission only by the second antenna; and
adjusting an operating frame rate of the camera to reduce or avoid the electromagnetic interference between the camera and the radio frequency system.

12. The electronic device according to claim 8, wherein after fixing at the second antenna is executed, wherein the one or more programs further comprise instructions configured to execute the steps of:
detecting, by means of the application processor, whether the camera is activated;
if no, transmitting a third preset instruction to the modem by means of the application processor; and
receiving the third preset instruction by means of the modem to recover an ability to switch between the first antenna and the second antenna.

13. The electronic device according to claim 8, wherein the detecting whether the electromagnetic interference occurs in the electronic device according to the at least one detected value of the communication frequency and the at least one detected value of the PLL frequency comprises:
determining a communication frequency set according to the at least one detected value of the communication frequency, wherein the communication frequency set comprises at least one communication frequency of the radio frequency system;
determining a PLL frequency set according to the at least one detected value of the PLL frequency, wherein the PLL frequency set comprises at least one PLL frequency; and detecting whether the electromagnetic interference occurs in the electronic device based on a ratio of the communication frequency set overlapping with the PLL frequency set.

14. The electronic device according to claim 8, wherein the obtaining the at least one detected value of the communication frequency and the at least one detected value of the PLL frequency comprises:
controlling the modem to execute the operations of obtaining the at least one detected value of the communication frequency and reporting the at least one detected value of the communication frequency to the application processor via a preset channel; and
controlling the application processor to execute the operations of receiving the at least one detected value of the communication frequency from the modem and obtaining the at least one detected value of the PLL frequency,
wherein the detecting whether the electromagnetic interference occurs in the electronic device according to the at least one detected value of the communication frequency and the at least one detected value of the PLL frequency comprises:
controlling the AP to detect whether the electromagnetic interference occurs in the electronic device according to the at least one detected value of the communication frequency and the at least one detected value of the PLL frequency.

15. A non-transitory computer-readable storage medium, wherein the storage medium stores a computer program for electronic data exchange, and the computer program enables a computer to execute the steps of:
responsive to detecting that the electronic device receives a voice communication service, detecting an operation state of the camera;
responsive to detecting that the camera of the electronic device is activated, detecting whether electromagnetic interference occurs between the camera and a radio frequency system of the electronic device;
if yes, responsive to determining that the first antenna is a currently activated antenna, transmitting a first preset instruction to the modem by means of the application processor; and
receiving the first preset instruction by means of the modem to switch the activated antenna from the first antenna to the second antenna and fix,
wherein the detecting whether the electromagnetic interference occurs between the camera and the radio frequency system of the electronic device comprises:
obtaining at least one detected value of a communication frequency of the radio frequency system and at least one detected value of a corresponding phase-locked loop (PLL) frequency at which the camera operates; and
detecting whether the electromagnetic interference occurs in the electronic device according to the at least one detected value of the communication frequency and the at least one detected value of the PLL frequency.

* * * * *